United States Patent [19]
Suzuki et al.

[11] Patent Number: 5,247,924
[45] Date of Patent: Sep. 28, 1993

[54] SHOCKWAVE GENERATOR USING A PIEZOELECTRIC ELEMENT

[75] Inventors: Syuzi Suzuki, Yokohama; Mamoru Izumi, Tokyo, both of Japan

[73] Assignee: Kabushiki Kaisha Toshiba, Kawasaki, Japan

[21] Appl. No.: 708,057

[22] Filed: May 30, 1991

[30] Foreign Application Priority Data

May 30, 1990 [JP] Japan .................... 2-138524

[51] Int. Cl.$^5$ .............................................. A61B 17/22
[52] U.S. Cl. .................... 128/24 EL; 128/660.03
[58] Field of Search .................. 604/22; 606/127, 128; 128/24 EL, 24 AA, 660.03, 804; 364/150; 310/334, 337, 340

[56] References Cited

U.S. PATENT DOCUMENTS

| | | |
|---|---|---|
| 4,156,863 | 5/1979 | Madison et al. |
| 4,446,395 | 5/1984 | Hadjicostis ............... 128/662.03 |
| 4,509,947 | 4/1985 | Lattin ............................ 604/266 |
| 4,718,421 | 1/1988 | Rohwedder et al. ........ 128/662.03 |
| 4,802,145 | 1/1989 | Mount, II ..................... 367/35 |
| 4,805,156 | 2/1989 | Attali et al. .................. 367/35 |
| 4,879,993 | 11/1989 | Reichenberger et al. ..... 128/24 EL |
| 4,901,709 | 2/1990 | Rattner ..................... 128/24 EL |
| 4,907,573 | 3/1990 | Nagasaki ................... 128/24 EL |
| 4,957,099 | 9/1990 | Hassler ..................... 128/660.03 |
| 5,001,676 | 3/1991 | Broding ..................... 367/31 |
| 5,009,232 | 4/1991 | Hassler et al. ............. 128/660.03 |
| 5,033,456 | 7/1991 | Pell et al. .................. 128/24 EL |
| 5,048,527 | 9/1991 | Okazaki .................... 128/660.03 |
| 5,058,590 | 10/1991 | Wurster ..................... 604/22 |
| 5,111,805 | 5/1992 | Jaggy et al. ............... 128/24 EL |

FOREIGN PATENT DOCUMENTS

| | | |
|---|---|---|
| 0107287 | 5/1984 | European Pat. Off. . |
| 404121 | 12/1990 | European Pat. Off. ........... 606/127 |
| 421286 | 4/1991 | European Pat. Off. . |
| 3430161 | 2/1986 | Fed. Rep. of Germany . |
| 8523024 | 3/1987 | Fed. Rep. of Germany . |
| 8809253 | 12/1989 | Fed. Rep. of Germany . |
| 2567394 | 1/1986 | France . |

*Primary Examiner*—Ralph Lewis
*Attorney, Agent, or Firm*—Oblon, Spivak, McClelland, Maier & Neustadt

[57] ABSTRACT

A shockwave generator is adapted to be coupled to an object through a liquid medium for ultrasound transmission to generate a shockwave in the object. The shockwave generator comprises a piezoelectric element having an ultrasound radiating surface, an acoustic matching layer formed on the ultrasound radiating surface of the piezoelectric element, a fluorine-resin coating layer formed on the acoustic matching layer and a bag provided in front of the ultrasound radiating surface of the piezoelectric element and holding water for ultrasound transmission, where the water is held in contact with the fluorine-resin coating layer.

11 Claims, 6 Drawing Sheets

SHOCKWAVE GENERATOR USING A PIEZOELECTRIC ELEMENT

BACKGROUND OF THE INVENTION

1. Field of the Invention

The present invention relates to a shockwave generator for use in the disintegration of a calculus and, in particular, to a shockwave generator equipped with a piezoelectric element.

2. Description of the Related Art

Recently a calculus disintegrating apparatus utilizing a shockwave has been employed for renal calculus diagnosis. With the apparatus of this type, a shockwave generator is placed outside a patient to radiate a shockwave at a calculus in the region of interest of a human being and to disintegrate it. The shockwave generator utilizes not only a piezoelectric element but also a spark, electromagnetic induction, or explosion energy.

Particular attention has been paid to a shockwave generator utilizing a piezoelectric element (hereinafter referred to as a piezoelectric type shockwave generator) because it can obtain a stable shockwave output at low costs.

The piezoelectric type shockwave generator usually comprises a concave surface type piezoelectric element and a water bag provided on the front side of the piezoelectric element. The piezoelectric element comprises a piezoelectric ceramic plate and a pair of electrodes provided one on each surface of the ceramic plate. The piezoelectric element has a concave surface as an ultrasound radiating surface and a geometrically determined focal point. The water bag holds a liquid medium for transmitting an ultrasound under a better condition in which case an acoustic matching layer is sometimes formed on the surface of the piezoelectric element to allow an acoustic coupling between the piezoelectric element and the water. The acoustic matching layer is normally formed of an epoxy resin. For a diagnostic treatment, the water bag surface is placed in contact with the surface of the patient body. The piezoelectric element, upon being supplied with high voltage, radiates a powerful ultrasound energy. The ultrasound thus radiated converges at the geometrical focal point of the piezoelectric element where a shockwave occurs. With a focal point set at the calculus, a shockwave generated is directed at the calculus to cause the calculus to be broken down.

In the case where the piezoelectric element is in direct contact with water, there occurs a drop in insulation resistance of the piezoelectric element, sometimes causing a short-circuiting across the paired electrodes on both surfaces of the piezoelectric element. Upon occurrence of a short-circuiting across these electrodes, electric current penetrates the patient through the bag water by a high voltage being applied to the patient, offering a "safety problem". Providing the acoustic matching layer on the surface of the piezoelectric element alleviates this problem to some extent. In the use of the shockwave generator for an extended period of time, the piezoelectric element is lowered in its insulation property. Further, the acoustic matching layer is liable to be separated from the piezoelectric element due to the swelling of the water-absorbed epoxy resin and a drop in the strength of its bonding to the piezoelectric element. For this reason, it is necessary to replace the shockwave generator with a new one for a relatively short period of time. A greater maintenance cost is also involved in the conventional apparatus.

SUMMARY OF THE INVENTION

It is accordingly the object of the present invention to provide a shockwave generator which can ensure a high water tightness at its piezoelectric element for an extended period of time and ensure and added safty to a patient.

According to the present invention, there is provided a shockwave generator adapted to couple an ultrasound to an object through a liquid medium for ultrasound transmission and to generate a shockwave in the object, comprising a piezoelectric element having an ultrasound radiating surface, and a hydrophobic resin layer provided on the ultrasound radiating surface of the piezoelectric element in a manner to make contact with the liquid medium. The liquid medium is held in a bag which is located, for example, in front of the ultrasound radiating surface of the piezoelectric element. According to the present invention, an acoustic matching layer may be provided between the piezoelectric element and the hydrophobic resin layer.

The hydrophobic resin layer is formed using such a resin as to have a small water absorption factor, such as a fluorine resin, and an excellent water-tight property. Since, in this way, the resin layer is provided on the ultrasound radiating surface of the piezoelectric element, it is possible to prevent the piezoelectric element from contacting with the liquid medium, such as water, and to achieve a shockwave generator of high duration, while ensuring an added safety.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A first embodiment of the present invention will be explained below with reference to the accompanying drawings.

Figure 1:
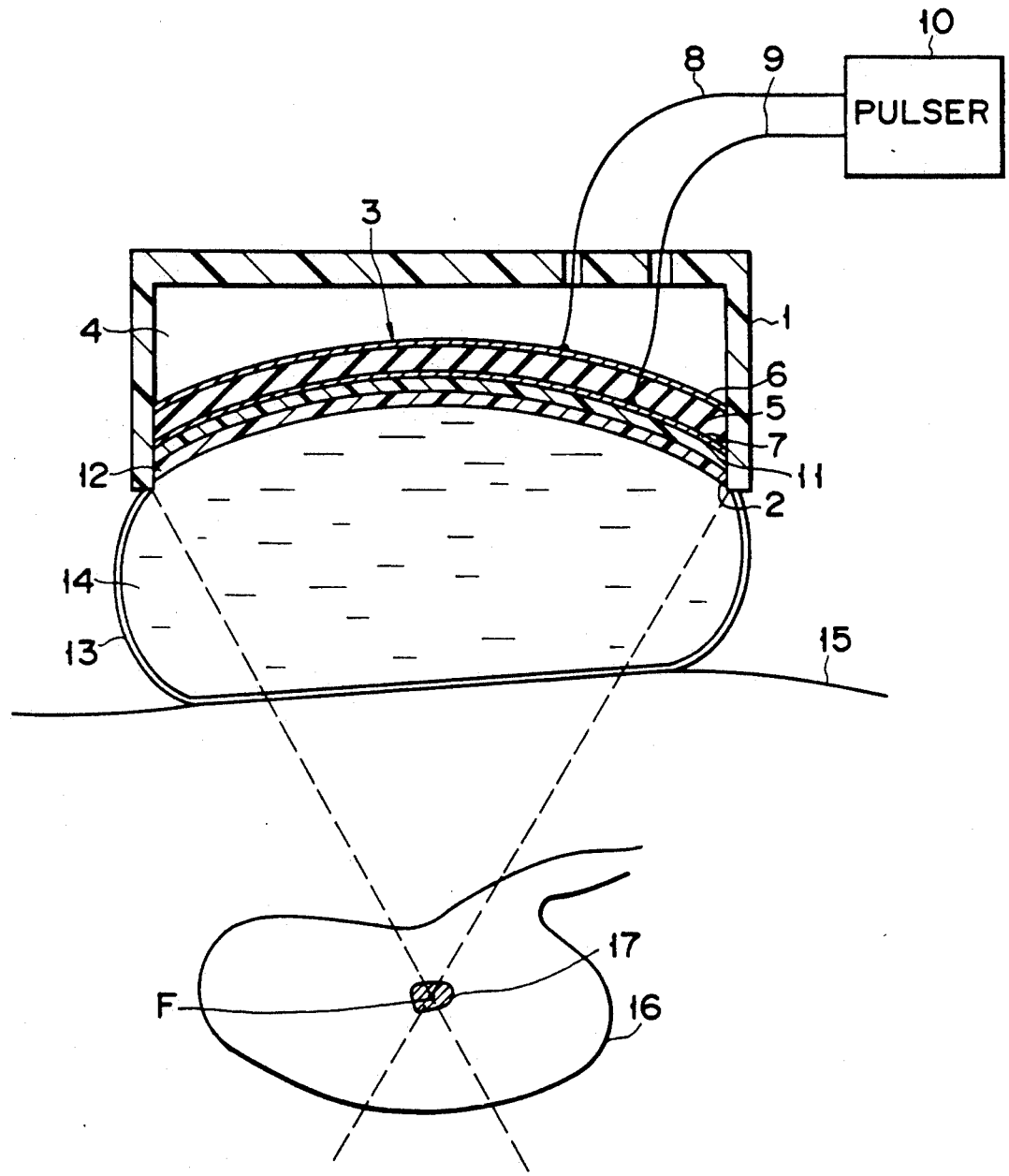
FIG. 1 is a cross-sectional view showing a shockwave generator according to a first embodiment of the present invention.

In FIG. 1, a shockwave generator has an opening 2 at its base 1 and a piezoelectric element 3 is fixed to the base 1 to close the opening 2. The piezoelectric element 3 is concavely curved at a front, ultrasound radiating surface and convexly curved at a back surface. A focal point F is provided which is geometrically determined by the concave configuration of the ultrasound radiating surface of the piezoelectric element 3. Between the back surface of the piezoelectric element 3 and the base 1 is defined an air space 4 where the piezoelectric element 3 is exposed to air. The supporting structure of the piezoelectric element 3 is called "an air backing type".

The piezoelectric element 3 comprises a piezoelectric ceramic plate 5 and electrodes 6 and 7 provided one on the front surface and one on the back surface of the ceramic plate 5. The electrodes 6 and 7 are connected by lead wires 8 and 9 to a pulser 10 for generating a high voltage pulse. The piezoelectric element 3 is responsive to a high voltage pulse coming from the pulser 10 to generate a high-power ultrasound. The ultrasound generated is radiated principally from the front surface of the piezoelectric element 3 due to the aforementioned air backing effect An acoustic matching layer 11 is formed on the ultrasound radiating surface of the piezoelectric element 3. A layer 12 formed of a fluorine resin, that is, a hydrophobic resin, is provided on the acoustic matching layer 11. A water bag 13 made of a pliable material, such as a rubber, is mounted on the open end of the base 1 to close the opening 2. The water bag 13 contains water 14 as a liquid medium for the transmission of an ultrasound. The acoustic matching layer 11 is so provided as to obtain an acoustic coupling between the piezoelectric element 3 and the fluorine-resin containing layer 12. The acoustic matching layer 11 is made of, for example, an epoxy resin and its acoustic impedance is set to an intermediate value between the acoustic impedance of the piezoelectric element 3 and that of the fluorine-resin layer 12. By such acoustic matching layer 11, the ultrasound generating from the piezoelectric element 3 is efficiently front-radiated, enabling an increase in pressure of a shockwave generated at the focal point F. The fluorine-resin layer 12 is so provided as to prevent water 14 from reaching the piezoelectric element 3. In the case where the fluorine-resin layer 12 has its acoustic impedance set to an intermediate value between the acoustic impedance of the acoustic matching layer and that of the water 14, the fluorine-resin layer 12 never prevents the transmission of the ultrasound.

Upon medical diagnosis, the surface of the water bag 13 is placed in contact with a surface 15 of the back of a patient's kidney, that is, placed on the water bag's surface side opposite to that on which the base 1 is situated. In this state, the shockwave generator is so located as to set the focal point F of the piezoelectric element 3 in a registration relation to the renal calculus 17. Thereafter, the pulser 10 is driven to cause a high-voltage pulse to be applied to the piezoelectric element 3. As a result, a high power ultrasound is generated from the front surface, that is, the ultrasound radiating surface of the piezoelectric element 3. The generated ultrasound is converged at the focal point F where a shockwave is generated. As a result, a calculus 17 at the focal point F is disintegrated by the shockwave.

The layer 12 will now be explained below in more detail.

The fluorine resin is excellent in its water resistance over, for example, polyvinyl chloride, epoxy and phenol resins. Here, explanation will be given below of the case where polytetrafluoroethylene (PTFE), one of the fluorine resin, is employed for the layer 12. PTFE has features inherent to the fluorine resin, such as a small water absorption factor and water-tight property. PTFE has an acoustic impedance of about $3 \times 10^6$ kg/cm²·s, substantially the same order of magnitude as the acoustic impedance (about $8 \times 10^6$ kg/m²·s) of the epoxy resin used in the acoustic matching layer 10 and greater than that (about $1.5 \times 10^6$ kg/m²·s) of the water. As seen from the above, the fluorine-resin layer 12 has an acoustic impedance smaller than that of the acoustic matching layer 11 and greater than that of the water (liquid medium) 14. In such a case, if the layer 12 has a thickness which is one fourth of an odd multiple of the center wavelength ($\lambda$) of the ultrasound in the layer 12, such as $\lambda/4$ or $3\lambda/4$, then the requirements of the "acoustic matching" are substantially satisfied. Thus, the ultrasound coming from the piezoelectric element 3 is hardly attenuated in the fluorine resin layer 12. Since the sound velocity in PTFE is about 1,400 m/sec, the center waveform $\lambda$ becomes about 2.8 mm from a relation $\lambda = V/f$ (V: sound velocity in the medium, f: resonant frequency), provided that the resonant frequency of the piezoelectric element 3 is, for example, about 500 kHz. Therefore, the thickness of the layer 12 is preferably, for example, 0.7 mm corresponding to the $\lambda/4$ or about 2.1 mm corresponding to the $3\lambda/4$.

Figure 2:
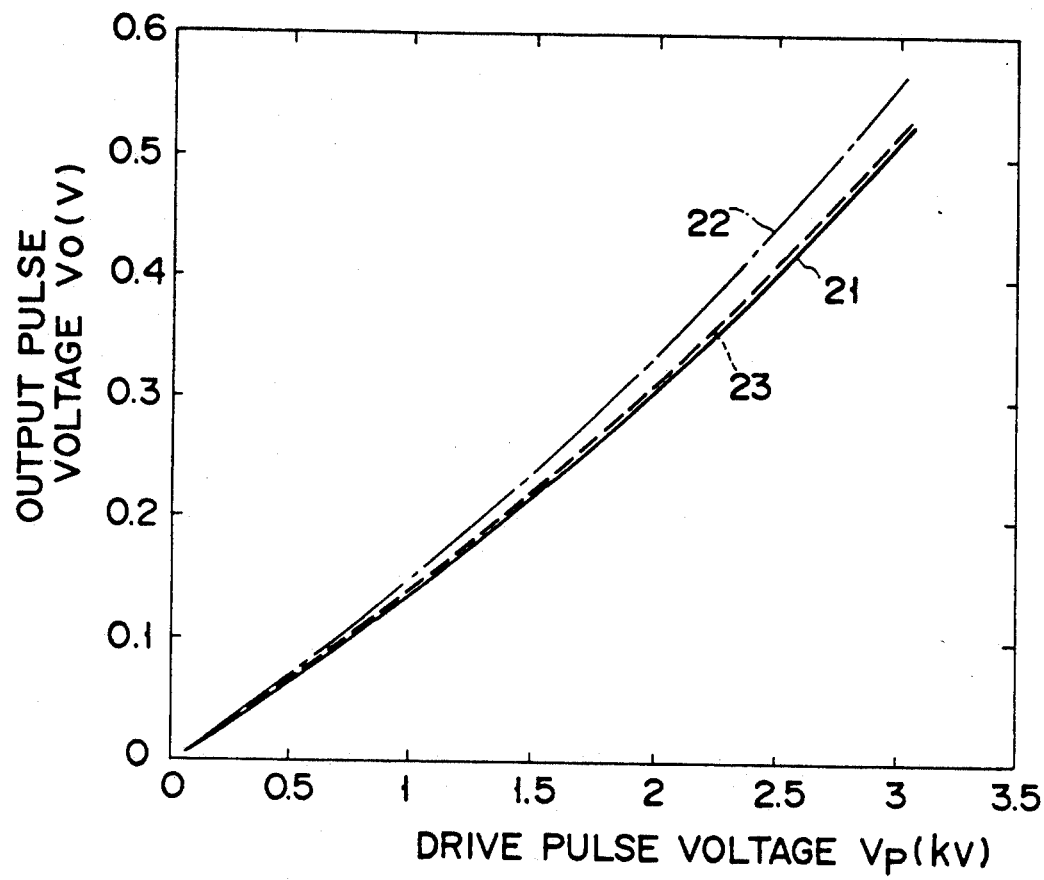
FIG. 2 is a graph showing a drive pulse voltage to output pulse voltage characteristic of various types of shockwave generators.

FIG. 2 represents a relation of a drive pulse voltage Vp applied form the pulser to the piezoelectric element to the output pulse voltage Vo, a result of actual measurements made on those shockwave generators of various structures using a piezoelectric element 300 mm in diameter. The output pulse voltage Vo is obtained by converting to an electric signal an ultrasound output which has been generating from the shockwave generator and received by a piezoelectric transducer. In FIG. 2, the solid line 21 shows a characteristic curve when the shockwave generator has an acoustic matching layer of $\lambda/4$ in thickness and formed of an epoxy resin and no PTFE layer. The dash dot line 22 in FIG. 2 shows a characteristic curve when the shockwave generator has an acoustic matching layer formed of an epoxy resin and overlying PTFE layer of $\lambda/4$ in thickness and the broken line 23 in FIG. 2 shows a characteristic curve when the shockwave generator has an acoustic matching layer formed of an epoxy resin and overlaying PTFE layer of $3\lambda/4$ in thickness. As evident from the graph of FIG. 2, the drive pulse voltage-to-output pulse voltage characteristic curves 22 and 23 when the shockwave generator has the PTFE layer are not largely different from the characteristic curve 21 when the shockwave generator has no PTFE layer. Thus even if the fluorine-resin layer 12, such as a PTFE layer, is provided as set out about, the shockwave generator has its own inherent performance unaffected thereby.

Figure 3:
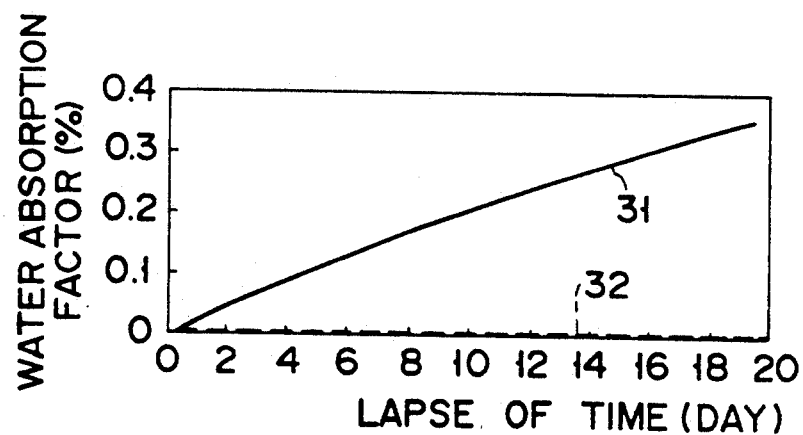
FIG. 3 is a graph showing a variation in water absorption factor of an epoxy resin and PTFE with time.

FIG. 3 is a graph showing a change of an epoxy resin layer and PTFE layer with time (day). As evident from lines 31 and 32 in the graph of FIG. 3, the water absorption factor is about 0.2% in 10 days for the epoxy resin layer and there is almost no change in 10 days for the PTFE layer. The difference in the water absorption factor between the epoxy resin layer and the PTFE layer influences the insulation resistance. The conventional shockwave generator having only an epoxy resin layer on the ultrasound radiating surface of the piezoelectric element involves a drop in insulation resistance of the piezoelectric element in a longer period of time, increasing a leak current. Further, the withstand voltage of the piezoelectric element is lowered and, in the worst case, short-circuiting occurs between the electrodes one on each surface of the piezoelectric element. According to the present invention, the shockwave generator has the PTFE layer as set out above and involves almost no drop in insulation resistance of the piezoelectric element over an extended period of time. Thus the leak current can be disregarded and there is no drop in the withstand voltage of the piezoelectric element. Therefore, the shockwave generator enjoys an extended service life, while ensuring an added safty to a patient. As a result, it is possible to much reduce a running cost without maintenance cost.

As will be appreciated from the above, the present shockwave generator with the PTFE layer formed on the piezoelectric element is remarkably smaller in water absorption factor than the shockwave generator having the epoxy resin layer. Therefore, the present shockwave generator ensures an adequate withstand voltage without involving a drop in the electric insulation over an extended period of time and an added safty to the patient. A higher water resistance can be obtained over a long period of time for the PTFE layer of $\lambda/3$ than for the PTFE layer of $3\lambda/4$ in thickness. A ready workability, such as grinding or compression molding, is more advantageously gained for the PTFE layer of $3\lambda/4$ than for the PTFE layer of $\lambda/4$ in thickness.

The fluorine-resin layer can be formed of not only the PTFE layer, but also, for example, a polychlorotrifluoroethylene (PCTFE) or a polyvinylidene fluoride (PVDF) layer. Even for these fluorine resins, substantially the same result can also be obtained.

Figure 4:
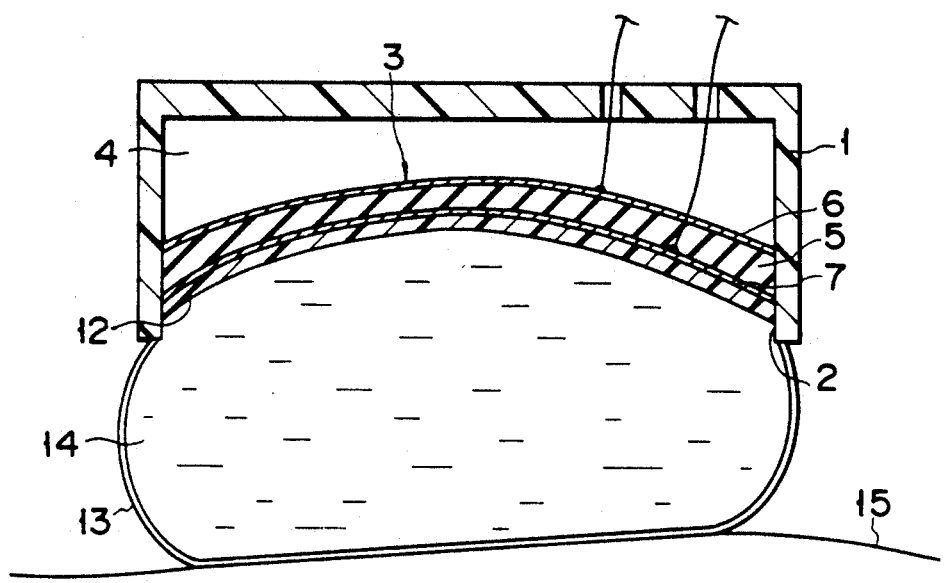
FIG. 4 is a cross-sectional view showing a shockwave generator according to a second embodiment of the present invention.

FIG. 4 shows a shockwave generator according to a second embodiment of the present invention. In this embodiment, a fluorine-resin layer 12 is formed directly on a piezoelectric element 3 with no interposing acoustic matching layer 11 therebetween. In this case, the acoustic impedance of the layer 12 is selected to be an intermediate value between the acoustic impedance of the piezoelectric element 3 and that of the water 14 and, further, the requirements of the "acoustic matching" can be satisfied by selecting the layer 12 to be an odd multiple of a $\lambda/4$ its thickness.

A third embodiment of the present invention will be explained below with reference to FIG. 5. A base 41 of the shockwave generator is made of an insulating material, such as a glass epoxy resin, which is near in thermal expansion coefficient to a piezoelectric element, lightweight and greater in mechanical strength. A concave surface type piezoelectric element 42 is joined to the base 41 and comprised of a plurality of piezoelectric units 43 (here 16 units). The piezoelectric units 43 are joined together by an adhesive as one unit with its front surface, that is, the ultrasound radiating surface concavely formed and its rear surface convexly formed. A hole 50 is provided at the central area of the piezoelectric element 42 and a space 44 is defined between the base 41 and the back of the piezoelectric units. This embodiment is also of an air backing type such that the back surface of the piezoelectric unit 43 is exposed to air in the space 44.

The piezoelectric unit 43, like the piezoelectric unit 3 shown in FIG. 1, comprises a piezoelectric ceramic plate and a pair of electrode formed one on each surface of the piezoelectric ceramic plate. These electrodes are connected by lead wires to a pulser for generating a high voltage pulse. When a high voltage pulse is applied to the piezoelectric unit 43, a high-power ultrasound is generated from the front surface of the piezoelectric element 42 and a shockwave is generated at a local point which is geometrically determined by the concave surface, that is, the ultrasound radiating surface, of the piezoelectric element 42.

An acoustic matching layer 51 of, for example, an epoxy resin, is formed on the ultrasound radiating surface of the piezoelectric element 42. A fluorine-resin layer 52 is formed on the surface of the acoustic matching layer 51, outer peripheral surface of the base 1 and inner wall surface of the hole 50.

A water bag 53 made of an elastic material, such as rubber, is attached to the outer peripheral surface of the base 41. Water 54 is contained as a liquid medium for the transmission of a ultrasound. Even in this embodiment, an increase in pressure of a shockwave generated can be accomplished through an acoustic coupling by the acoustic matching layer 51 between the piezoelectric element 42 and the fluorine resin coating 52. Further, the water 54 is prevented by the fluorine resin layer 52 from reaching the piezoelectric element 42.

An ultrasonic probe 56 is inserted into the hole 50 and radiates an ultrasound, which is weaker than the ultrasound generated from the piezoelectric element 42, toward a region of interest of the patient and receives an echo coming from the patient side. An echo signal which is output as an electric signal from the ultrasonic probe 56 is supplied to an ultrasound image device, not shown, where a patient's tomogram (B mode image) is displayed. The doctor can locate the shockwave generator, while observing the corresponding tomogram.

As in the first embodiment shown in FIG. 1, the fluorine-resin layer 52 is selected to have a thickness one fourth, or an odd multiple of, the center frequency $\lambda$ of the ultrasound generated from the piezoelectric element 42. Stated in more detail, if the resonant frequency of the piezoelectric element 42 is about 500 kHz for the fluorine resin layer 52 of, for example, PTFE, the center frequency $\lambda$ is about 2.8 mm. Thus the layer 52 is so selected as to have a thickness of 0.7 mm or 2.1 mm and, further, has to be equal in diameter to, or greater than, the diameter (for example, about 300 mm) of the piezoelectric element 42. It is very difficult to prepare a fluorine-resin layer 52 of uniform thickness and a diameter as set out above, by means of an ordinary lathe.

A method for the manufacture of the fluorine-resin layer 52 will be explained below by way of example with reference to FIGS. 7A to 7D.

Figure 7A:
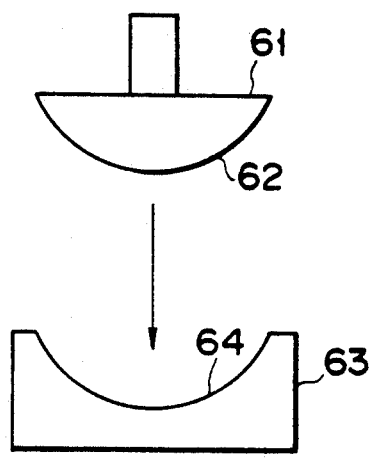
FIGS. 7A to 7D are views showing the steps of manufacturing the shockwave generator shown in FIG. 5.
Figure 7B:
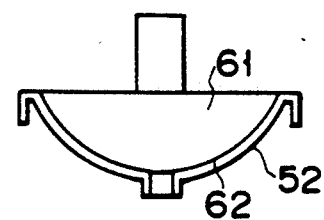
Figure 7C:
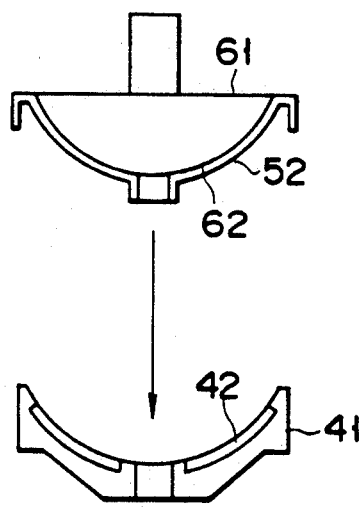

In FIG. 7A are shown a metal mold 61 and PTFE block 63 prepared. The mold 61 has a curvature conforming to that of the inner surface of a fluorine-resin layer 52. The block 63 has a ground cancave surface 63 equal in curvature to the convex surface 62. The concave surface 64 of the fluorine-resin block 63 is bonded to the convex surface 62 of the mold 61 by an adhesive of relatively weak adhesion. With the fluorine-resin block 63 set in place in the mold 61, it is ground to a layer 52, by a numerical-controlled (NC) lathe, as shown in FIG. 7B.

Figure 5:
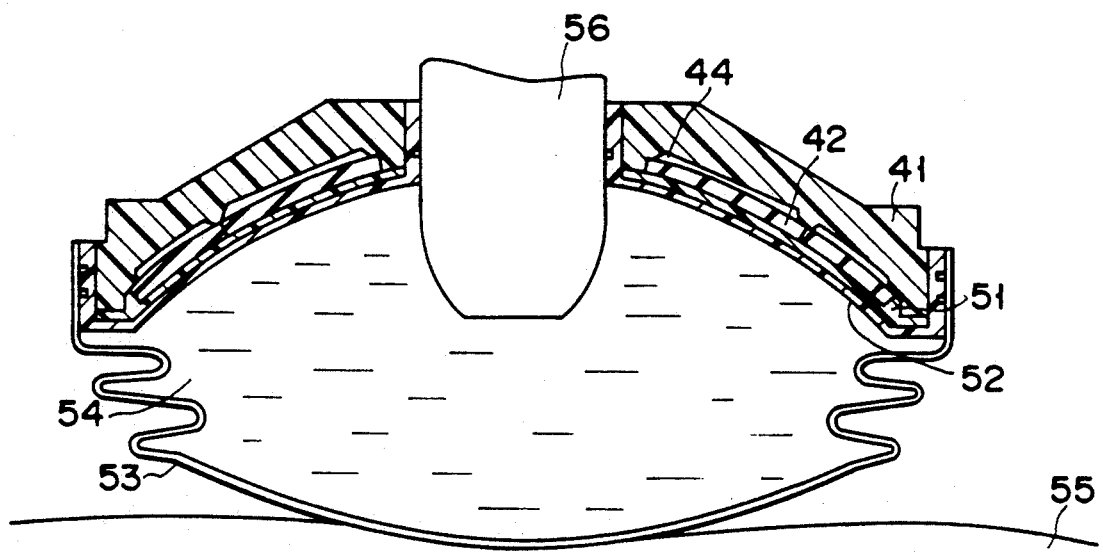
FIG. 5 is a cross-sectional view showing a shockwave generator according to a third embodiment of the present invention.
Figure 6:
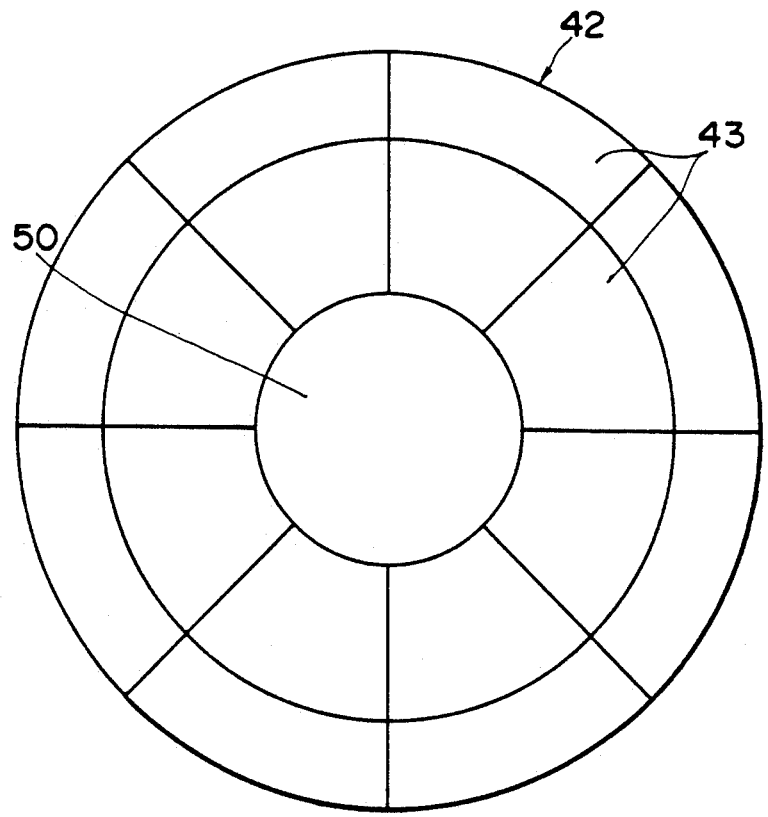
FIG. 6 is a plan view showing a piezoelectric element in FIG. 5.

With a piezoelectric element 42 fixed in place on a base 41 as shown in FIG. 5, an acoustic matching layer 51 shown in FIG. 5 is formed on the base 41 and a fluorine-resin layer 52 is joined to the matching layer 51. The acoustic matching layer 51 is formed of a material prepared by mixing a proper filler, containing a curing agent, with an epoxy resin so as to have a predetermined acoustic impedance. Such an acoustic matching layer material is applied, in a liquid form, to the base 1 shown in FIG. 7C. Generally, an epoxy resin, being mixed with a curing agent, has a property varying from a liquid to a solid state and is used as an adhesive. The mold 61 with the fluorine-resin layer 5 formed on the convex surface is compressed to the base 41 on which the acoustic matching layer has been applied in the liquid state. This step utilizes the property of the epoxy resin as set out above. As a result, the epoxy resin layer is cured, while maintaining a predetermined thickness. At this time, the fluorine-resin layer 52 serves as a mold for making the epoxy resin layer a predetermined shape. By so doing, an acoustic matching layer (epoxy resin) 51 and fluorine-resin layer 52 are laminated on the base 41.

Figure 7D:
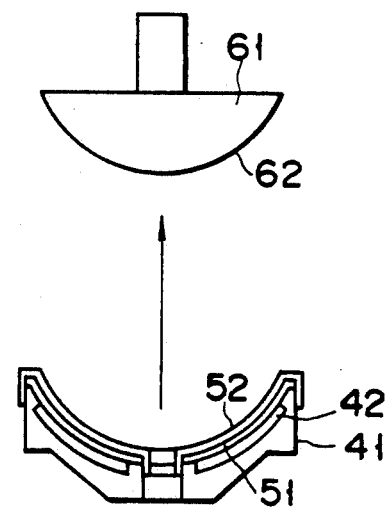

By separating the mold 61 away from the molding, it is possible to obtain, on the base 41, the acoustic matching layer 51 of the epoxy resin and a fluorine-resin layer 52, as shown in FIG. 7D.

A fourth embodiment of the present invention will be explained below with reference to FIG. 4.

Figure 8:
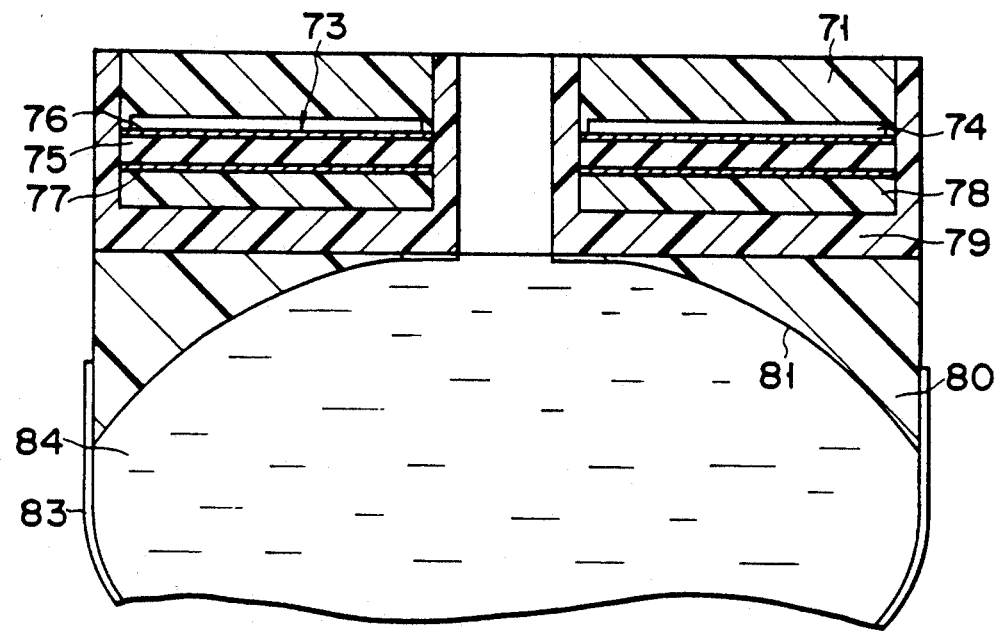
FIG. 8 is a cross-sectional view showing a major part of a shockwave generator according to a fourth embodiment of the present invention.

In this embodiment, a ring-like piezoelectric element 73 is formed on the undersurface of a ring-like base 71 as shown in FIG. 8. A space 74 is provided between the base 71 and the piezoelectric element 73. The piezoelectric element comprises a piezoelectric ceramic plate 75 and electrodes 76 and 77 one on each surface of the ceramic plate 75. This piezoelectric element 73 may be divided into units as in the embodiment shown in FIG. 5. A ring-like acoustic matching layer 78 is formed on the undersurface of the piezoelectric element 73 as shown in FIG. 8 and a fluorine-resin layer 79 is so provided as to surround the undersurface (FIG. 8) of the acoustic matching layer 78 and inner and outer side walls of base 71 and piezoelectric element 73. An acoustic lens 80 is provided beneath the undersurface (FIG. 8) of the fluorine-resin layer 79 and has a concave surface 81 as viewed from the lower side of FIG. 8. The concave surface 81 of the acoustic lens 80 is so provided that an ultrasound generated from the piezoelectric element 73 converges at a focal point which is geometrically determined by the concave surface 81 of the acoustic lens 80. A water bag 83 is mounted on the front side of the acoustic lens 80 and water 84 is held in the water bag 83 as a liquid medium for the transmission of the ultrasound.

The requirements of the acoustic lens 80 are met by the following features: ideally (1) its acoustic impedance is equal to that of the water (liquid medium); (2) its ultrasound attenuation absorption is small; and (3) there is a great difference between it and the water 84 with respect to their ultrasound velocity. In the case of the concave lens as shown in FIG. 8, the acoustic lens 80 is made of a material greater in sound velocity than the water (about 1,500 m/s). Generally, a resin satisfies such an acoustic lens 80 and that sound impedance is equal to those of the acoustic matching layer 78 and fluorine-resin layer 79.

The use of the acoustic lens 80 as set out above enables the piezoelectric element 73, acoustic matching layer 78 and fluorine-resin layer 79 to be made a ring-like type. For this reason, the fluorine-resin layer 79 can be punched by a punching step into a ring-like one. Thus it is not necessary, according to the present invention, to use any complex manufacturing step.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A shockwave generator adapted to be coupled to an object through a liquid medium for ultrasound transmission to generate a shockwave in the object, comprising:
   a piezoelectric element having an ultrasound radiating surface;
   an acoustic matching layer provided on the ultrasound radiating surface of the piezoelectric element; and
   a fluorine resin layer provided on the acoustic matching layer in a manner to make contact with the liquid medium;
   wherein said acoustic matching layer is formed using a material having an acoustic impedance which is intermediate between the acoustic impedance of the piezoelectric element and that of the fluorine layer.

2. The shockwave generator according to claim 1, further comprising a base for supporting the piezoelectric element.

3. The shockwave generator according to claim 1, wherein a space is provided between the base and a side of the piezoelectric element opposite to that on which the ultrasound radiating surface of the piezoelectric element is situated.

4. The shockwave generator according to claim 1, wherein said piezoelectric generator has a concave ultrasound radiating surface.

5. The shockwave generator according to claim 1, wherein said piezoelectric element comprises a piezoelectric ceramic plate and a pair of electrodes one on each surface of the piezoelectric ceramic plate.

6. The shockwave generator according to claim 1, wherein said fluorine resin layer has a thickness which is one fourth of an odd multiple of the center wavelength of the ultrasound in the fluorine resin layer.

7. The shockwave generator according to claim 1, wherein said fluorine resin layer is formed using a material having an acoustic impedance which is intermediate between the impedance of the acoustic matching layer and that of the liquid medium.

8. The shockwave generator according to claim 1, wherein said fluorine resin layer is formed using polytetrafluoroethylene.

9. The shockwave generator according to claim 1, further comprising a bag located in front of an ultrasound radiating surface of the piezoelectric element and holding a liquid medium for ultrasound transmission.

10. A shockwave generator adapted to be coupled to an object through a liquid medium for ultrasound transmission to generate a shockwave in the object, comprising:

a piezoelectric element having an ultrasound radiating surface;

a fluorine resin layer located on the ultrasound radiating surface in a manner to make contact with the liquid medium;

an acoustic lens provided in front of the fluorine resin layer; and an acoustic matching layer present between the piezoelectric element and the fluorine resin layer.

11. The shockwave generator according to claim 10, wherein the piezoelectric element and fluorine resin layer are so formed as to have a ring-like configuration.

* * * * *